US008165087B2

(12) United States Patent
Panabaker

(10) Patent No.: US 8,165,087 B2
(45) Date of Patent: Apr. 24, 2012

(54) LOCATION CONTEXT SERVICE HANDOFF

(75) Inventor: Ruston Panabaker, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 1303 days.

(21) Appl. No.: 11/824,766

(22) Filed: Jun. 30, 2007

(65) Prior Publication Data

US 2009/0003281 A1 Jan. 1, 2009

(51) Int. Cl.
*H04W 4/00* (2009.01)
(52) U.S. Cl. ........................................................ 370/331
(58) Field of Classification Search .......... 370/331–334; 709/203, 225; 455/436, 422, 432, 439, 440, 455/438, 414, 417; 463/29; 340/10
See application file for complete search history.

(56) References Cited

U.S. PATENT DOCUMENTS

| 5,293,642 | A | 3/1994 | Lo | 455/331 |
|---|---|---|---|---|
| 6,321,092 | B1 | 11/2001 | Fitch et al. | 455/456 |
| 6,952,181 | B2 | 10/2005 | Karr et al. | 342/457 |
| 6,975,864 | B2* | 12/2005 | Singhal et al. | 455/438 |
| 7,171,217 | B2 | 1/2007 | Beuck | 455/456.1 |
| 7,197,308 | B2* | 3/2007 | Singhal et al. | 455/436 |
| 7,596,120 | B2* | 9/2009 | Kim et al. | 370/331 |
| 2002/0176579 | A1 | 11/2002 | Deshpande et al. | 380/270 |
| 2004/0203789 | A1 | 10/2004 | Hammond et al. | 455/440 |
| 2004/0203883 | A1 | 10/2004 | Jollis | 455/456.1 |
| 2005/0277428 | A1 | 12/2005 | Nathan-Brown | 455/456.3 |
| 2006/0120329 | A1* | 6/2006 | Kim et al. | 370/331 |
| 2007/0025293 | A1 | 2/2007 | Choi | 370/331 |
| 2007/0026871 | A1 | 2/2007 | Wager | 455/456.1 |
| 2007/0032225 | A1* | 2/2007 | Konicek et al. | 455/417 |
| 2007/0075864 | A1* | 4/2007 | Culpepper et al. | 340/572.1 |
| 2007/0155489 | A1* | 7/2007 | Beckley et al. | 463/29 |
| 2008/0233927 | A1* | 9/2008 | Moon et al. | 455/414.1 |
| 2009/0005061 | A1* | 1/2009 | Ward et al. | 455/456.1 |
| 2011/0006882 | A1* | 1/2011 | Twitchell, Jr. | 340/10.1 |

OTHER PUBLICATIONS

Spinney; "*Cellular-to-WiFi Handoff, Micro-LBS, and the Symbiotic Power of Location*"; http://www.lbs360.net/LBSArticles/CellularWiFi.pdf; ESRI, 2003; pp. 1-5.

Balachandran, et al.; "*Wireless Hotspots: Current Challenges and Future Directions*"; http://research.microsoft.com/~bahl/Papers/Pdf/monet05.pdf; 2005; pp. 265-274.

Wac; "*Towards QoS-awareness of Context-aware Mobile Applications and Services*"; http://eprints.eemcs.utwente.nl/7085/01/Wac_PhDStudentSymposium_OnTheMove_2005.pdf; pp. 1-13.

* cited by examiner

*Primary Examiner* — Hassan Phillips
*Assistant Examiner* — Prenell Jones
(74) *Attorney, Agent, or Firm* — Merchant & Gould

(57) ABSTRACT

A location service providing system and method for repeatedly providing a location service.

20 Claims, 10 Drawing Sheets

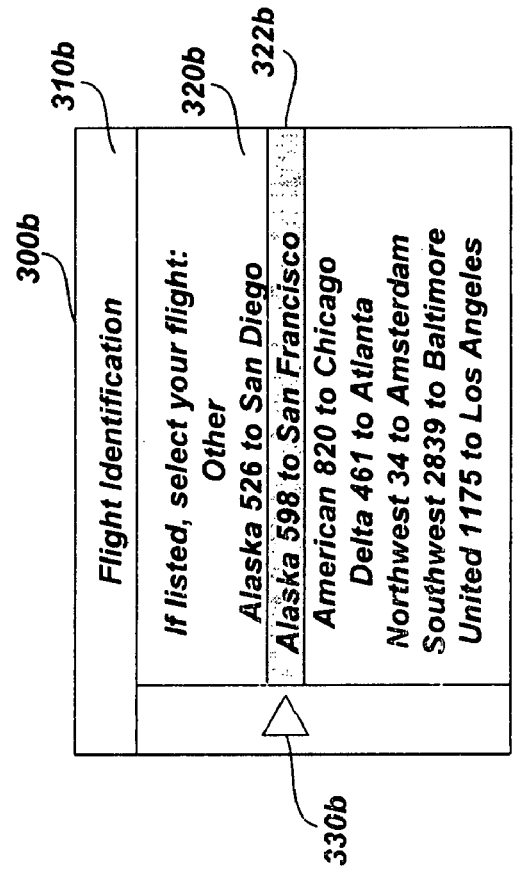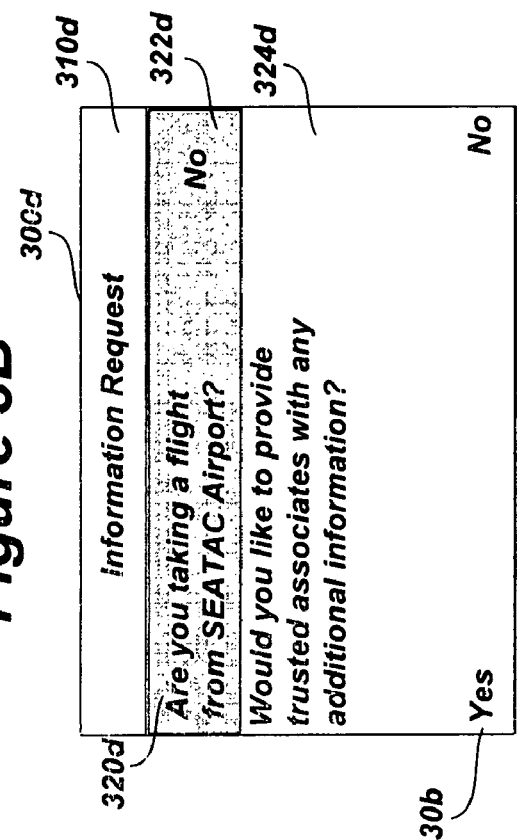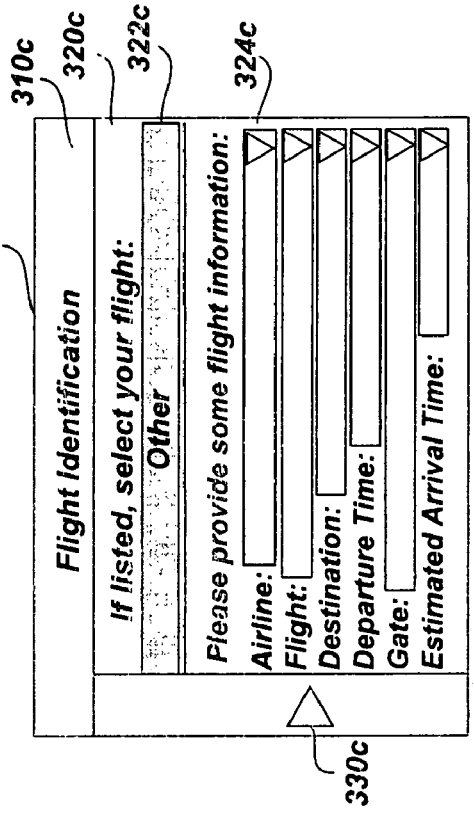

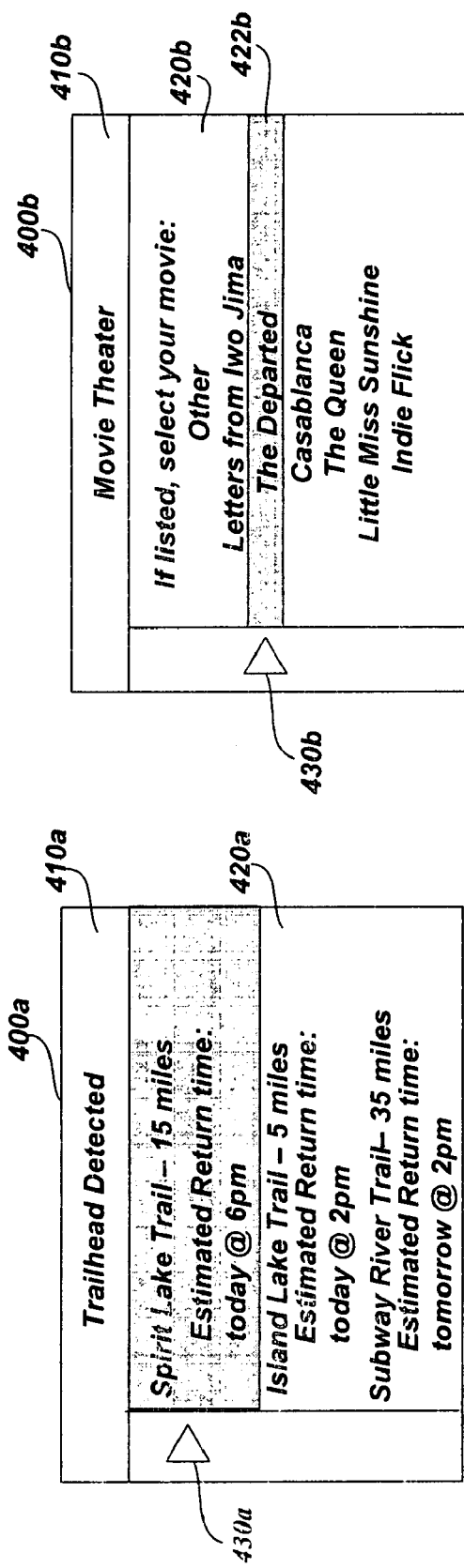
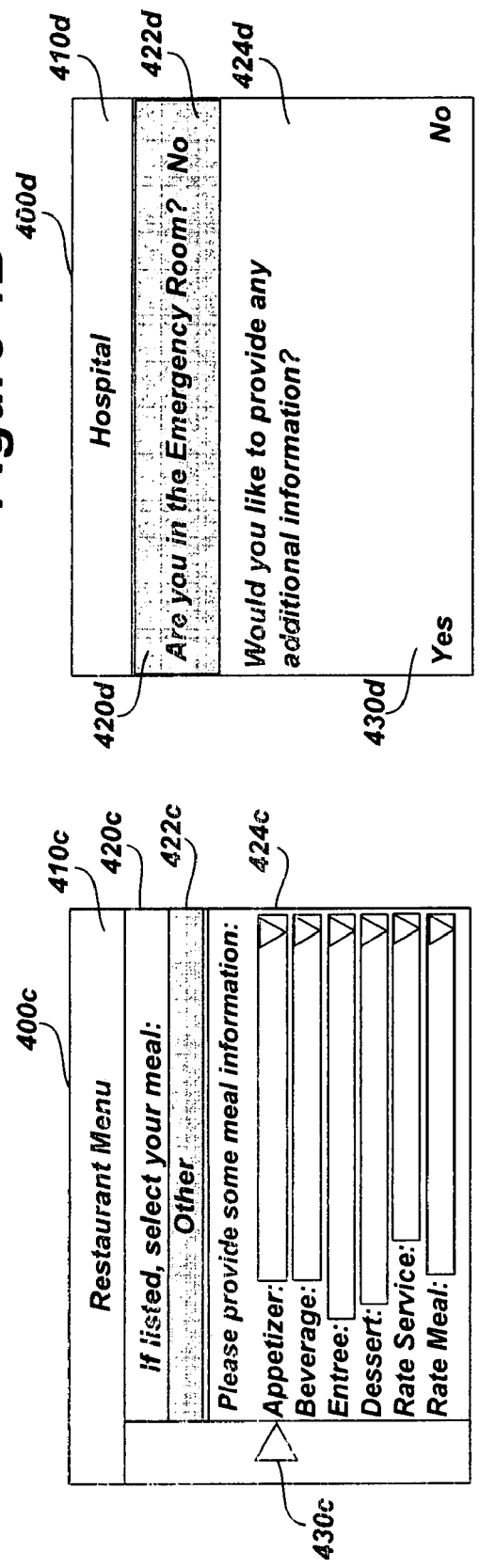
Figure 4A
Figure 4B
Figure 4C
Figure 4D

LOCATION CONTEXT SERVICE HANDOFF

BACKGROUND

Location based services will often strive to selectively track and/or report the geographical location of an individual mobile device. Unfortunately, providing these services everywhere the mobile device travels can be difficult to accomplish. Location based services may be temporarily interrupted when the device travels outside of a particular coverage area. Interruptions may also occur as a result of an operational restriction imposed to limit active tracking of the device, such as while traveling on an airplane due to restrictions in the use of wireless data communications technologies on aircraft.

SUMMARY

This Summary is provided to introduce a selection of concepts in a simplified form that are further described below in the Detailed Description. This Summary is not intended to identify key features and/or essential features of the claimed subject matter. Also, this Summary is not intended to limit the scope of the claimed subject matter.

The disclosure relates to location context integration for individual mobile computing devices to provide admissive handoff between location based services which may share gathered location information with others designated as being valuable to share this information with. Contextual guidelines and/or rules are selectively established for each mobile computing device. When various contextual situations are identified, the established guidelines and rules are followed to provide a desired and/or optimal solution for at least one service to continue to track the location of an individual mobile computing device. Where appropriate some solutions allow the admissive location based services to continue operating by easily transitioning the responsibility for tracking location information associated with the individual mobile computing device from the mobile device to another service, such as an airline's service information about the location of their aircraft upon which the mobile computing device may be found. Alternatively, some solutions may leave the responsibility for tracking location with the mobile computing device, even after the location context information may indicate that service loss or disruption is possible for a portion of offered location based services. Other solutions stop tracking of the individual mobile computing device by the admissive location based services, at least until service is requested again.

In this manner, location based services are extended, transition management is automated, and contextual information about a geographical location is leveraged by the individual mobile device. Thus, accuracy of reported context increases and customer experience is enhanced.

BRIEF DESCRIPTION OF THE DRAWINGS

Non-limiting and non-exhaustive exemplary embodiments of the present disclosure are described with reference to the following drawings in which:

FIGS. 3A-3D represent block diagram views of sample screenshots suitable for a mobile computing device to illustrate location context service handoffs at an airport;

FIGS. 4A-4D represent block diagram views of sample screenshots suitable for a mobile computing device to illustrate location context service handoffs in accordance with various embodiments;

DETAILED DESCRIPTION

Figure 1:
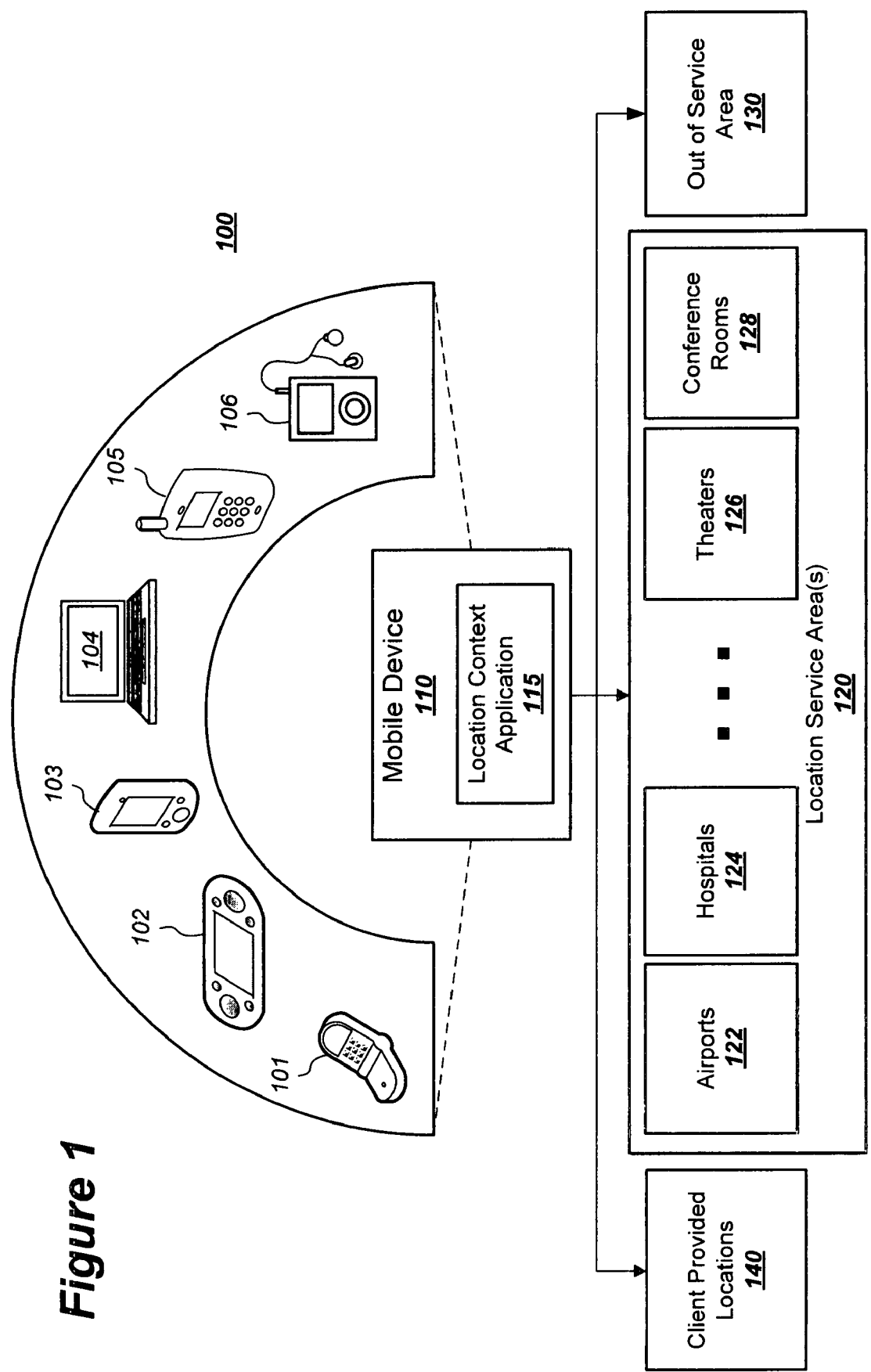
FIG. 1 represents one example of an operational environment suitable for a mobile computing device with an integrated location context application to provide admissive handoff of location based services.

Embodiments are described more fully below with reference to the accompanying drawings, which form a part hereof, and which show specific exemplary embodiments. However, embodiments may be implemented in many different forms and should not be construed as limited to the embodiments set forth herein; rather, these embodiments are provided so that this disclosure will be thorough and complete, and will fully convey the scope. Embodiments may be practiced as methods, systems or devices. Accordingly, embodiments may take the form of an entirely hardware implementation, an entirely software implementation or an implementation combining software and hardware aspects. The following detailed description is, therefore, not to be taken in a limiting sense.

The logical operations of the various embodiments are implemented (1) as a sequence of computer implemented steps running on a computing system and/or (2) as interconnected machine modules within the computing system. The implementation is a matter of choice dependent on the performance requirements of the computing system implementing the invention. Accordingly, the logical operations making up the embodiments described herein may be referred to alternatively as operations, steps or modules.

Using location context integration within an individual mobile computing device, a system may provide admissive handoff between various location based services to avoid any service interruption. Authorized location based services may share gathered location information with others approved to share this information. ***for at least one service to continue to track the location of an individual mobile computing device. Where appropriate some solutions allow the admissive location based services to continue operating by easily transitioning the responsibility for tracking location information associated with the individual mobile computing device from the mobile device to another service, such as an airline's service information about the location of their aircraft upon which the mobile computing device may be found. Alternatively, some solutions may leave the responsibility for tracking location with the mobile computing device, even after the location context information may indicate that service loss or disruption is possible for a portion of offered location based services. Other solutions stop tracking of the individual mobile computing device by the admissive location based services, at least until service is requested again.

The present disclosure provides embodiments for a service to track location of an individual's mobile device by easily transitioning the responsibility for tracking the location from the user's own mobile device to another service. For example, a mobile device on an airplane might transition to an airline's service information about the location of their aircraft when the mobile device powers down prior to take off. This capability to transition to alternate location service providers enables a variety of rich location based service scenarios that involve matching a mobile computing device's online user identity (e.g., instant messaging, etc.) and other preferences with available location context information.

Throughout the specification, an example of a mobile computing device with location context integration is used. The mobile computing device example is for exemplary purposes only and not meant for limiting the disclosure in any manner. A computing device with location context integration may include any combination or type of location services and/or retail locators.

Referring now to FIG. 1, wherein block diagrams of one exemplary operational environment 100 for a mobile computing device 110 with an integrated location context application 115 to provide admissive handoff of location based services. In one embodiment, mobile computing device 110 may include any type of mobile computing device having an integrated location context application 115. In one embodiment, the mobile computing device 110 may be associated with a messaging or tracking service, which lets a user designate whether a trusted observer/requestor may see location information that is enhanced by available location context. Thus, an authorized requestor may receive real-time locations, speed, headings, and descriptions of the surroundings or location context of the mobile computing device 110. Additionally, authorized requestors may receive email or SMS alerts when the mobile computing device 110 moves across various designated areas identified below, such as an emergency room of a hospital. Notification may also be made to designated observers if certain conditions are satisfied, such as when the mobile computing device 110 exceeds a given speed limit or stops responding to valid network requests.

In various embodiments, the mobile computing device 110 may be embodied in a cellular phone 101, a game console 102, a personal digital assistant (PDA) 103, a laptop computer 104, a smart phone 105, a personal media player 106, a wireless device, a handset, a telemetry device, a tracking device, etc. Often the available location context information will vary depending on the complexity of the mobile computing device 110. For example, a laptop or smart phone may be able to retrieve additional information from personal data storage locations, such as calendars or phone address lists, to supplement detected location context information. In one embodiment, the mobile computing device 110 includes computing device 500 as exemplified in FIG. 5.

The exemplary operational environment 100 includes regions representing location service area(s) 120 and other regions representing out of service areas 130. The location service areas 120 not only define the region where location based services are provided so contextual information may be shared by/with the mobile device 110, but the region may also define known locations where specific activities occur that may require or suggest admissive handoff of location based services to an alternate location service provider. These locations include transportation terminals or ports, such as airports 122, ferry terminals, train stations, bus stops, boat ports or docks, and other departure or arrival points where a user may shortly lose service; whether from leaving coverage area or because they will be asked to turn off all electronic mobile computing device prior to departure. Other locations where regulations or common courtesy may dictate that a mobile computing device be powered down include hospitals 124, theaters 126, conference rooms 128, restaurants, churches, concerts, gyms and/or swimming pools, sporting or athletic events, and the like. Even locations like roads or freeways may invoke a need to evaluate other location service providers, such as locations where cell phone use is illegal while driving so that a user may want to temporarily shut off the mobile computing device to avoid the temptation of using the device.

A third region represents client provided locations 140. Client provided locations 140 may include additional contextual information which may be provided by the mobile computing device 110 or a user thereof. For example, a mobile computing device may associate a particular location, such as a dental complex, with a scheduled event at that time, such as a dental appointment, and be able to provide additional information, such as contact information for the dentist, to a trusted requester. The device may also query the user to obtain additional information about a location. Moreover, the user may also indicate that the mobile computing device should not report location information in certain areas, such as personal areas (homes, bedrooms, bathrooms) or areas that they do not want to be disturbed at despite adequate coverage. In various embodiments, the client provided location 140 originally may have been part of the location service areas 120 or, more likely, the out of service areas 130.

In another embodiment, driving location service could use current route information to predict the current location of a user by the service. For example, you are driving between Seattle and Portland and have entered a route or the service has recognized your route and although it has not received your location due to lack of connectivity it predicts your location based on the route, the known speed on that route, etc.

Another embodiment uses a signal such as a bluetooth signal, NFC swipe or RFID tag to trigger the handoff or UI asking whether they would like to transition to an alternate location service while entering a specific plane for a flight.

In one embodiment, radio-frequency identification (RFID) tags or transponders store data that may be remotely retrieved and used to provide automatic identification. In one embodiment, a short-range (hands width) wireless technology mainly aimed at usage in This capability could also be used on school busses to allow parents to track the location of their child assuming the school bus is connected to the network and makes it's location available to the parents service.

Figure 2:
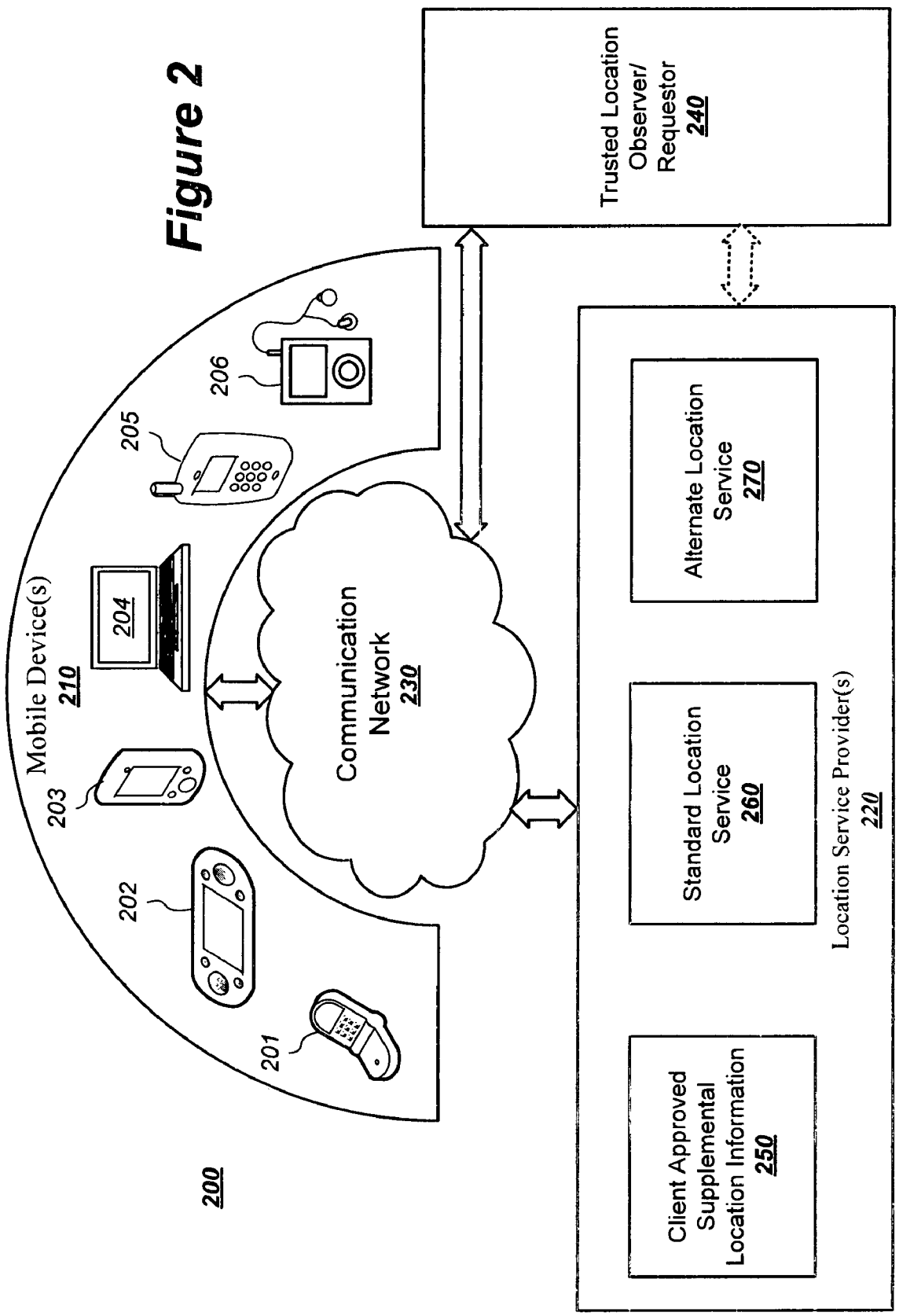
FIG. 2 represents one example of a system overview suitable for tracking a mobile computing device using service handoff between various location services.

Referring now to FIG. 2, a system overview 200 suitable for tracking a mobile computing device using service handoff between various location services is shown. System 200 represents a modular overview of a computing environment. System 200 may include mobile computing device 210, location service provider 220, communication network 230, and trusted location observer/requestor 240. Location service provider 220 and trusted location observer/requestor 240 may be associated with a server and/or a computing device. The computing device may include a desktop computing device, mobile computing device, a laptop, a personal digital assistant, a notebook computer, and/or any other type of computing device functional to store data. In one aspect, the mobile computing device includes computing device 500 as exemplified in FIG. 5.

The disclosure relates to context integration for individual mobile devices for providing admissive handoff between location based services to share location information with others, such as trusted location requestors 240, who have been designated as being valuable to share this information with. Each location requestor 240 may be provided with different levels of information. For example, one requestor may only be authorized to receive information about which city the mobile computing device is located, while others may be given the exact coordinates of the mobile computing device.

Contextual guidelines and/or rules are selectively established for each mobile computing device. For example, a user may authorize a location service provider to automatically transfer tracking from a first location service 260 to an alternate location service 270 upon detection of a location or power down event. When various contextual situations as described in FIG. 1 are identified, the established guidelines and rules may be followed to provide a desired and/or optimal solution for at least one service to continue to track the location of an individual mobile computing device. Where appropriate some solutions allow the admissive location based services to continue operating by easily transitioning the responsibility for tracking location information from the mobile computing device to another service.

For example, if the location context information indicates that the mobile computing device is at an airport, then a subsequent request to power down the device might indicate that the device was aboard a flight departing from the airport approximately at the time of the power down request. The user of the mobile computing device could be queried to determine which flight and whether tracking of the flight should continue using an airline's service information about the location of their aircraft.

Alternatively, some solutions may leave the responsibility for tracking location with the mobile computing device, even after the location context information may indicate that service loss or disruption is possible for a portion of offered location based services. Other solutions stop tracking of the individual mobile computing device by the admissive location based services, at least until service is requested again.

Contextual guidelines and/or rules are selectively established for each mobile device. When various contextual situations are identified, the established guidelines and rules are followed to provide a desired and/or optimal solution for a service to continue to track an individual mobile device's location. Where appropriate some solutions allow the admissive location based services to continue operating by easily transitioning the responsibility for tracking the individual mobile device's location from the mobile device to another service, such as an airline's service information about the location of their aircraft upon which the mobile device is found. Alternatively, some solutions may leave the responsibility for tracking the individual mobile device's location with the mobile device, even though the context may indicate that some portion of the location based services could potentially be lost. Other solutions stop tracking of the individual mobile device by the admissive location based services.

In this manner, location based services are extended, transition management is automated, and contextual information about a geographical location is leveraged by the individual mobile device. Thus, accuracy of reported context increases and customer experience is enhanced.

Referring now to FIGS. 3A-3D, block diagram views of sample screenshots suitable for a mobile computing device to illustrate location context service handoffs at an airport are shown. The location service may be an online service which shares location information between users and which is capable of accessing alternate location services for an object such as an airplane to represent the location of the user. For example, in FIG. 3A the mobile computing device provides a user interface based on the location context of the device and the fact that it is being turned off (or stopping communications with the network) which asks the user if they are taking a flight. The location service may present additional context hand-off to an alternate service and about the location of the user such as the flight number, altitude and speed. FIG. 3B provides a user interface that asks whether they would like to associate their location with a specific flight number. The interface only shows the airlines and specific flights that are scheduled to leave from a given airport on the user's phone. FIG. 3C queries the user for specific flight information. FIG. 3D requests authorization to share flight information with trusted associates. One embodiment, provides an alert to other users of a user's change in status to getting on or getting off a specific flight in this fashion described above. Another embodiment, automatically asks a user if they are getting on a flight when they get close to an airport and providing walking directions and/or visual aids such as maps or pictures in getting to their check-in desk and departure gate.

In an alternative implementation, the system asks the user whether they would like to turn off their GPS and/or cellular modems when they are in a location which is known to be part of an airport or the location of the tarmac or automatically turning off. For example, User turns off their device when they are within the boundaries of a commercial airport Referring now to FIGS. 4A-4D, block diagram views of sample screenshots suitable for a mobile computing device to illustrate other location context service handoffs in accordance with various embodiments are shown. FIG. 4A shows a trailhead for various hikes, and requests user input. FIG. 4B shows a user interface for a movie theater. FIG. 4C illustrates a user interface for a restaurant. FIG. 4D depicts a user interface for a hospital.

Figure 5:
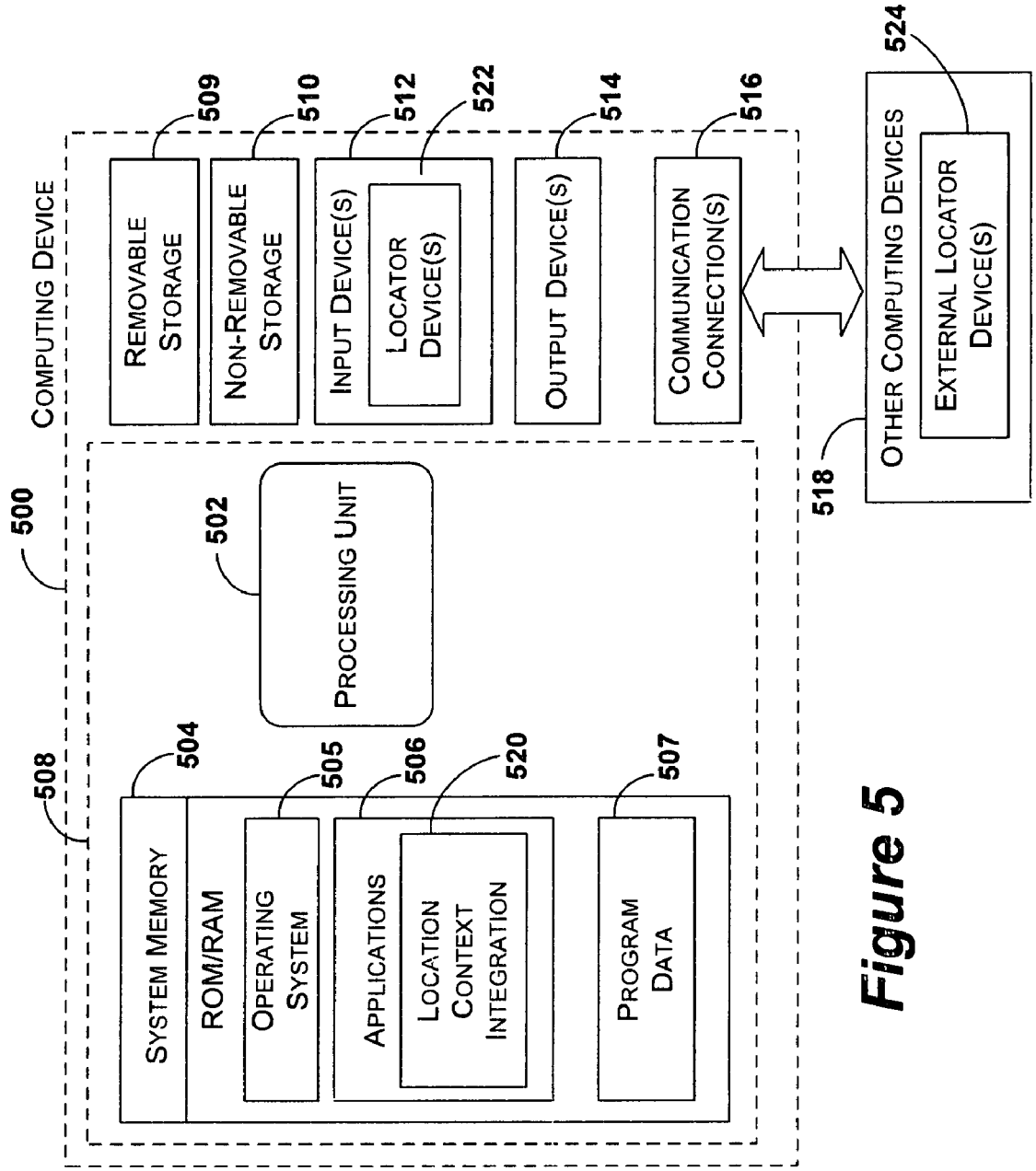
FIG. 5 represents an exemplary computing device.

Referring to FIG. 5, an exemplary system for implementing the invention includes a computing device, such as computing device 500. In a basic configuration, computing device 500 may include any type of stationary computing device or a mobile computing device. In various embodiments, computing device 500 may be embodied in a cellular phone 101, a game console 102, a personal digital assistant (PDA) 103, a laptop computer 104, a smart phone 105, a personal media player 106, a wireless device, a handset, a telemetry device, a tracking device, etc. Computing device 500 typically includes at least one processing unit 502 and system memory 504. Depending on the exact configuration and type of computing device, system memory 504 may be volatile (such as RAM), non-volatile (such as ROM, flash memory, and the like) or some combination of the two. System memory 504 typically includes operating system 505, one or more applications 506, and may include program data 507. In one embodiment, applications 506 further include application 520 for location context integration. In one embodiment, a portion of the contextual information used by application 520 is the location of the computing device 500. The location context application 520 can determine the context information by, for example, querying the user and/or receiving GPS (Global Positioning System) information from the computing device 500. This basic configuration is illustrated in FIG. 5 by those components within dashed line 508.

Computing device 500 may also have additional features or functionality. For example, computing device 500 may also include additional data storage devices (removable and/or non-removable) such as, for example, magnetic disks, optical disks, or tape. Such additional storage is illustrated in FIG. 5 by removable storage 509 and non-removable storage 510. Computer storage media may include volatile and non-volatile, removable and non-removable media implemented in any method or technology for storage of information, such as computer readable instructions, data structures, program modules or other data. System memory 504, removable storage 509 and non-removable storage 510 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 500. Any such computer storage media may be part of device 500. Computing device 500 may also have input device(s) 512 such as a keyboard, mouse, pen, voice input device, touch input device, etc. In one embodiment, input device(s) 512 further include locator device(s) 522 to provide location of device 500. Output device(s) 514 such as a display, speakers, printer, etc. may also be included.

Computing device 500 also contains communication connection(s) 516 that allow the device to communicate with other computing devices 518, such as over a network or a wireless network. In one embodiment, the other computing devices 518 further include external locator device(s) 524, such as a telemetry device, a tracking device, etc. to provide location of the computing device 500. Communication connection(s) 516 is an example of communication media. Communication media typically embodies computer readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of example, and not limitation, communication media may include wired media such as a wired network or direct-wired connection, and wireless media such as acoustic, RF, infrared and other wireless media. The term computer readable media as used herein includes both storage media and communication media.

In one embodiment, locator device(s) 522 and/or external locator device(s) 524 may communicate with a communications network 230 such as a radio access network (RAN) to obtain communication services such as voice, video, packet data, broadcast, messaging, etc. The locator device(s) 522 and/or external locator device(s) 524 may also receive signals from one or more satellites, which may be part of the United States Global Positioning System (GPS), the European Galileo system, the Russian Glonass system, or some other satellite positioning system. The locator device(s) 522 and/or external locator device(s) 524 may measure received signals from these satellites and/or signals from base stations in the RAN and may obtain pseudo-range measurements for the satellites and/or timing measurements for the base stations. The pseudo-range measurements and/or timing measurements may be used to derive a position estimate of the computing device 500 using one or a combination of positioning methods such as assisted GPS (A-GPS), standalone GPS, Advanced Forward Link Trilateration (A-FLT), Enhanced Observed Time Difference (E-OTD), Observed Time Difference Of Arrival (OTDOA), Enhanced Cell ID, Cell ID, etc. Once a position estimate has determined a location in one embodiment, contextual information related to the location may be applied to the application 520 for location context integration.

Referring now to FIGS. 6-10, a variety of methods, in accordance with various embodiments, are described in terms of firmware (e.g., firmware that is used by a processor such as a micro-processor, a micro-controller, an ASIC, or a DSP processor), software, and/or hardware with reference to a flow diagram. Describing the various methods by reference to a flow diagram enables one skilled in the art to develop programs, including instructions to carry out the methods on suitably configured electronic amplification devices. In various embodiments, portions of the operations to be performed by an amplification device may constitute circuits, general purpose processors (e.g., micro-processors, micro-controllers, or digital signal processors), special purpose processors (e.g., application specific integrated circuits or ASICs), state machines, hardware arrays, reconfigurable hardware, and/or software made up of executable instructions. The executable instructions may be embodied in firmware logic, reconfigurable logic, a hardware description language, a state machine, an application-specific integrated circuit (ASIC), or combinations thereof.

With respect to various embodiments using a software implementation, at least one of the processors of a suitably configured computing device (see e.g., computing device 500 in FIG. 5) executes the instructions from a storage medium. The computer-executable instructions may be written in a computer programming language or executable code. If written in a programming language conforming to a recognized standard, such instructions may be executed on a variety of hardware platforms and may interface with a variety of operating systems. Although the various embodiments are not described with reference to any particular programming language, it will be appreciated that a variety of programming languages may be used to implement the teachings of the embodiments as described herein. Furthermore, it is common in the art to speak of software in one form or another (e.g., program, procedure, process, application, etc.) as taking an action or causing a result. Such expressions are merely a shorthand way of saying that execution of the software by a computing device causes the processor of the computer to perform an action or a produce a result.

Figure 6:
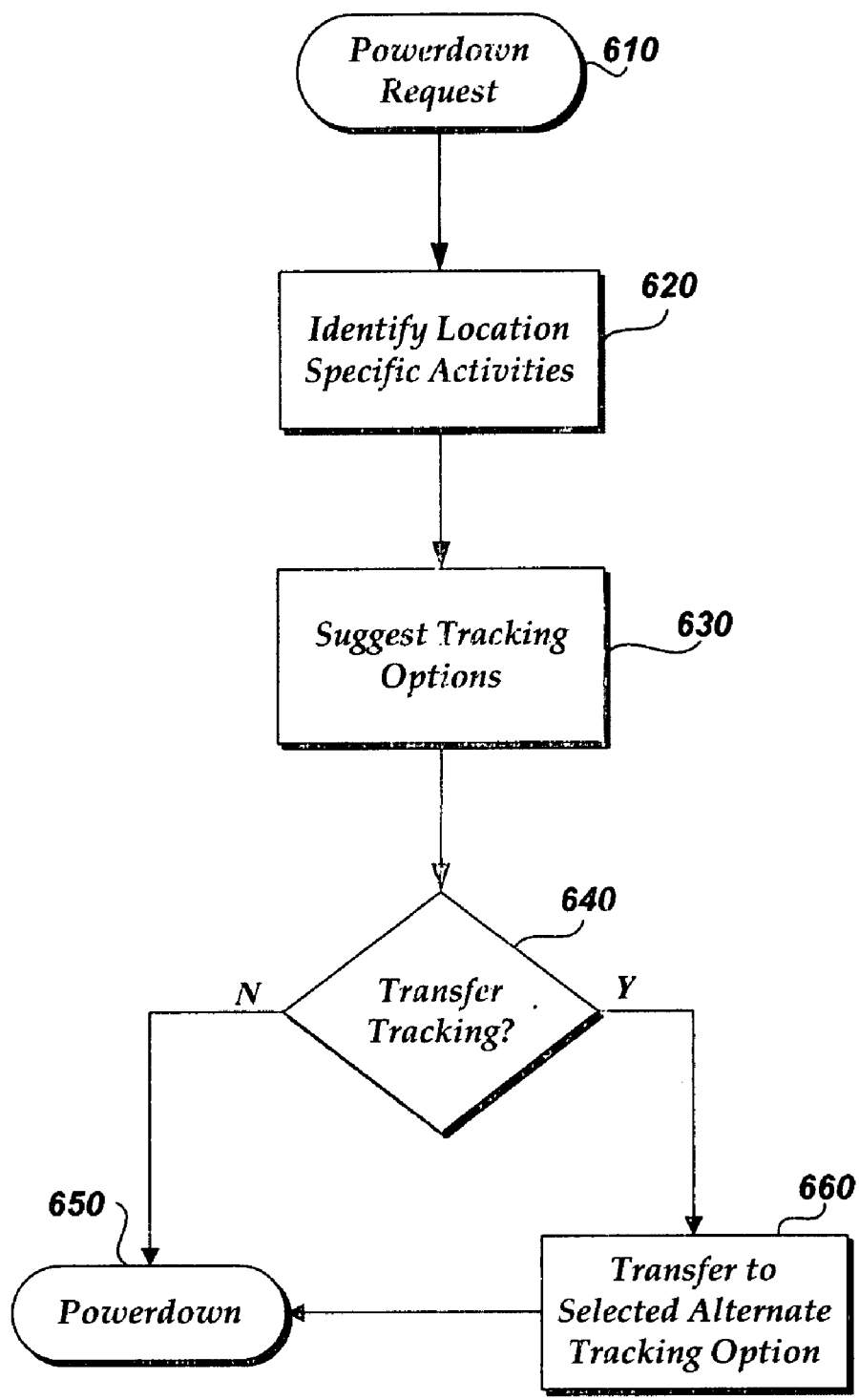
FIG. 6 represents an operation flow diagram for selectively transitioning responsibility for location tracking information before a power down event.

Referring now to FIG. 6, an operation flow diagram for selectively transitioning responsibility for location tracking information before a power down event is shown.

Figure 7:
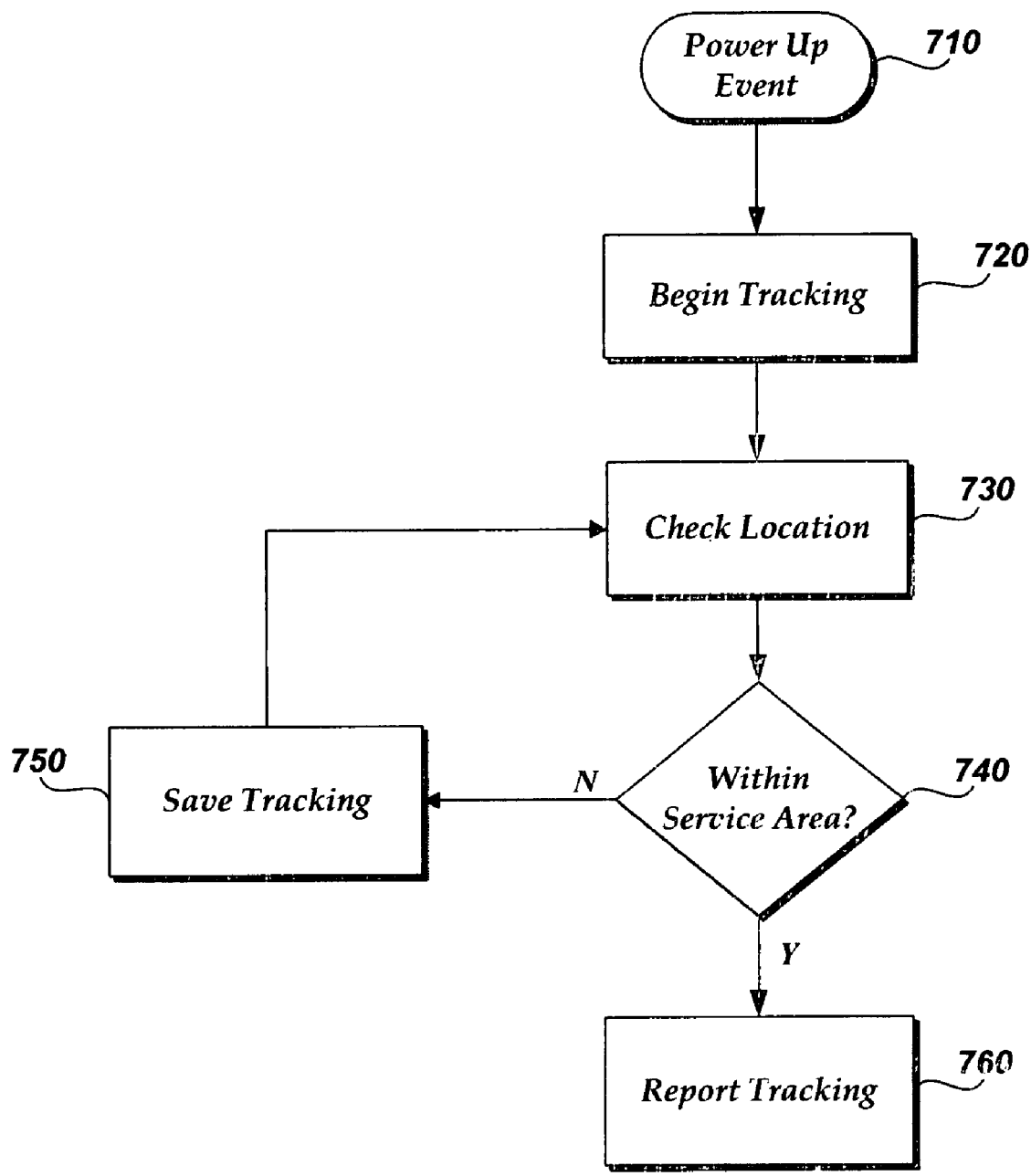
FIG. 7 represents an operational flow diagram for assuming responsibility for reporting location tracking information after a power up event.

Referring to FIG. 7, an operational flow diagram for assuming responsibility for reporting location tracking information after a power up event is shown. Switching back the location of the user in the service to their device's location when it is turned on, location determined and connectivity restored. In one embodiment, the context of the flight that was taken is used to lower the time taken to get a GPS lock (GPS devices can dramatically shorten the time to lock on satellites if it knows which satellites it should be listening for. If the device knows it is likely to be turned back on in a specific new location it can lock faster).

Figure 8:
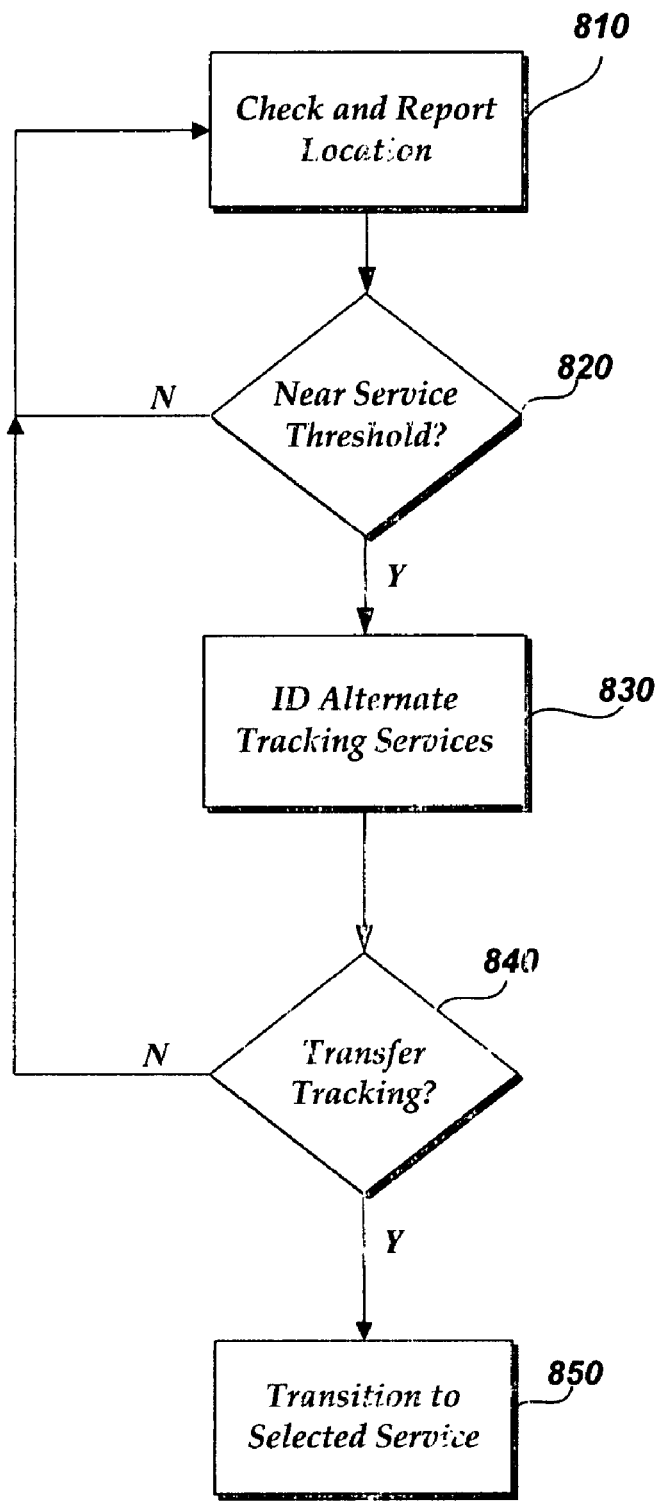
FIG. 8 represents an operational flow diagram for selectively transitioning responsibility for location tracking information near a service threshold.

Referring to FIG. 8, an operational flow diagram for selectively transitioning responsibility for location tracking information near a service threshold is shown.

Figure 9:
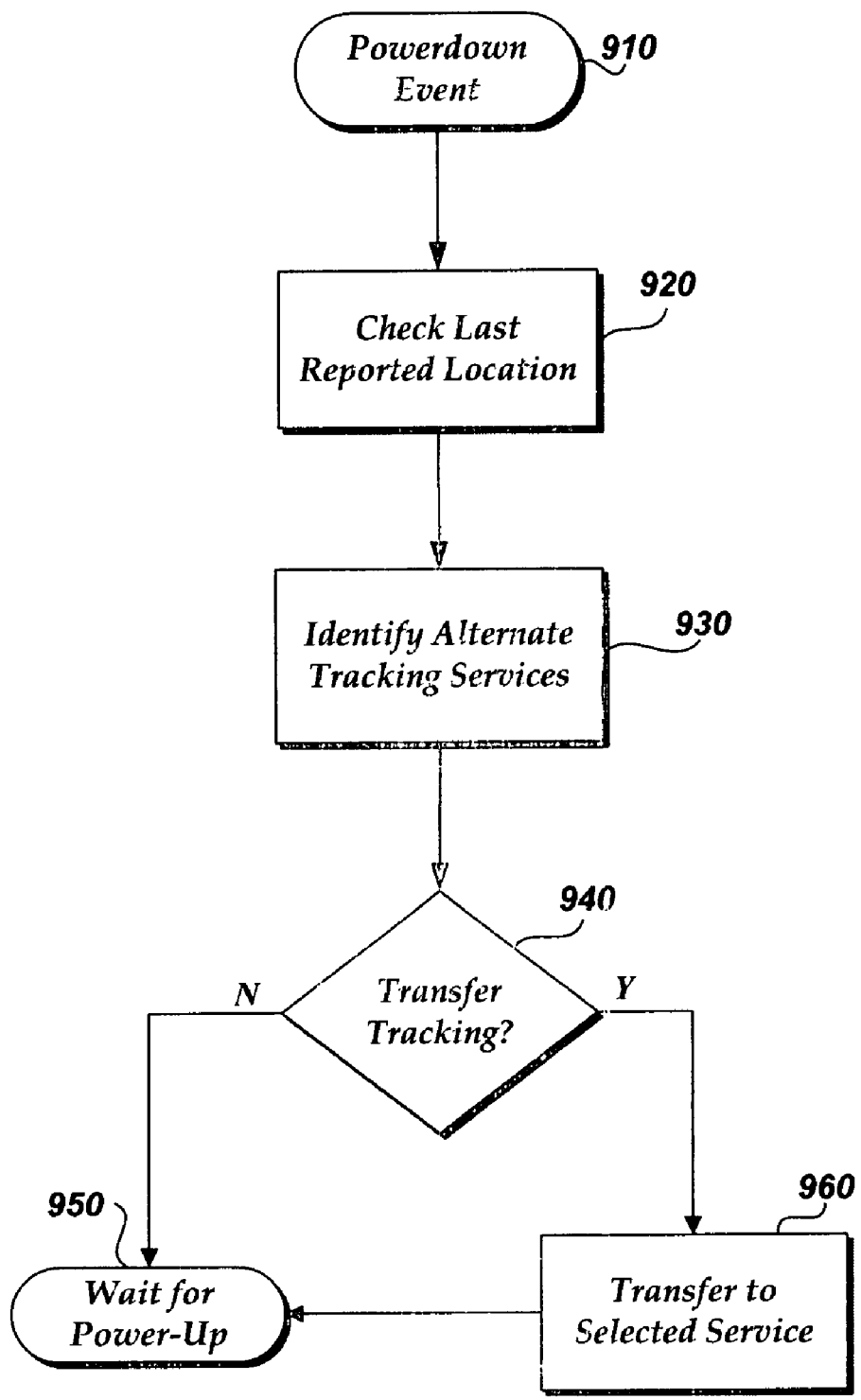
FIG. 9 represents an operational flow diagram for selectively transitioning responsibility for location tracking information after a power down event.

Referring to FIG. 9, an operational flow diagram for selectively transitioning responsibility for location tracking information after a power down event is shown.

Figure 10:
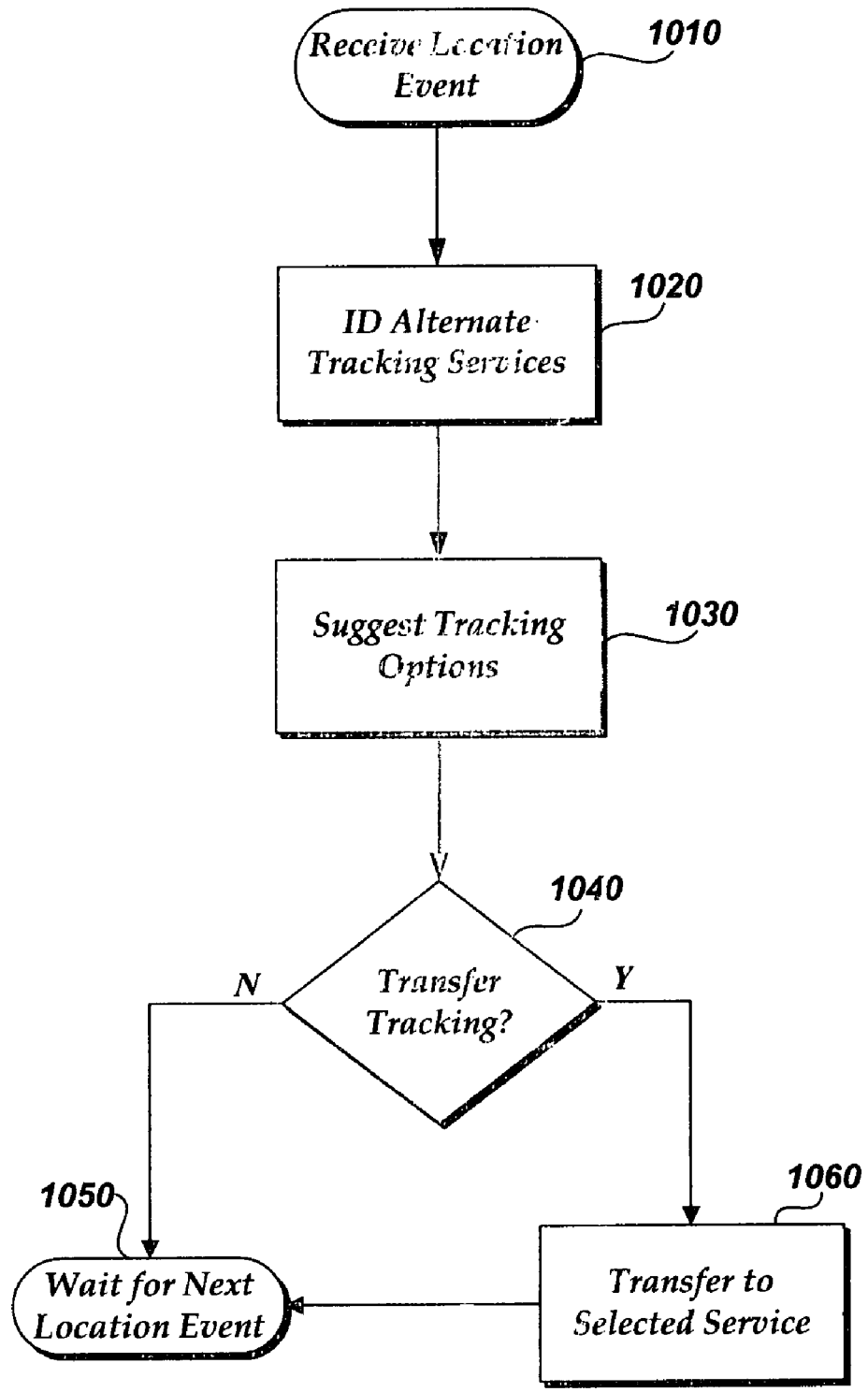
FIG. 10 represents an operational flow diagram for selectively transitioning responsibility for location tracking information after detection of a location event.

Referring to FIG. 10, an operational flow diagram for selectively transitioning responsibility for location tracking information after detection of a location event is shown.

Although specific embodiments have been illustrated and described herein, it will be appreciated by those of ordinary skill in the art and others, that a wide variety of alternate and/or equivalent implementations may be substituted for the specific embodiment shown in the described without departing from the spirit and scope of the present disclosure. This application is intended to cover any adaptations or variations of the embodiments discussed herein. Therefore, it is manifested and intended that the disclosure be limited only by the claims and the equivalence thereof.

Although the invention has been described in language that is specific to structural features and/or methodological steps, it is to be understood that the invention defined in the appended claims is not necessarily limited to the specific features or steps described. Rather, the specific features and steps are disclosed as forms of implementing the claimed invention. Since many embodiments of the invention can be made without departing from the spirit and scope of the invention, the invention resides in the claims hereinafter appended.

What is claimed is:

1. A computer-readable storage medium that is not a signal having computer-executable instructions stored thereon for providing admissive transition between location based services through location context integration, the instructions comprising:
   identifying a handoff event on a mobile computing device that is used to determine when to switch from a first location based service that provides a location of the mobile device to a designated second location based service that provides a location of the mobile device;
   requesting handoff information, based on available location context information, to determine whether to transition from the first location based service to the designated second location based service; and
   upon receiving handoff information, selectively transitioning from the first location based service to the designated second location based service in accordance with the received handoff information.

2. The computer-readable storage medium of claim 1, wherein the handoff event is selected from the group of events consisting of receiving a request to power down, receiving a location event, detecting proximity to a service threshold, detecting a power down event, and receiving user authorization to transition to the designated second location based service.

3. The computer-readable storage medium of claim 1, wherein the requested handoff information includes a request for user authorization to transition from the first location based service to the designated second location based service.

4. The computer-readable storage medium of claim 1, wherein the first location based service is provided by the mobile computing device and the designated second location based service is provided by a remote computing device.

5. The computer-readable storage medium of claim 1, further comprising:
   identifying available location based services;
   ranking the identified location based services relative to each other in accordance with the available location context information;
   requesting user authorization to transition to one of the ranked location based services; and
   upon receiving user authorization selecting at least one location based service, transitioning to the selected at least one location based service.

6. The computer-readable storage medium of claim 1, wherein the location context information indicates that the mobile computing device is located at an airport.

7. The computer-readable storage medium of claim 6, wherein the requesting handoff information asks for flight information from the user.

8. The computer-readable storage medium of claim 6, wherein the handoff event is a request to power down the mobile computing device.

9. The computer-readable storage medium of claim 8, wherein the requesting handoff information includes querying a user for flight information.

10. The computer-readable storage medium of claim 9, wherein the requesting handoff information includes requesting authorization to transition to the designated second location based service to track progress of the flight.

11. The computer-readable storage medium of claim 1, wherein the handoff event is a location event triggered by at least one of a bluetooth signal, a near-field communication (NFC) swipe, and/or a radio-frequency identification (RFID) tag.

12. The computer-readable storage medium of claim 1, wherein the handoff event is a location event indicating arrival at a location service area with a restrictive usage policy.

13. The computer-readable storage medium of claim 1, wherein the location service area is selected from the group consisting of a hospital, a theater, a school, a conference room, a restaurant, a church, a concert hall, an athletic stadium, a gymnasium, a swimming pool, and a library.

14. The computer-readable storage medium of claim 1, wherein the selective transitioning further comprises automatically transitioning to the second designated location based service authorized by a user of the mobile computing device.

15. A computer-implemented method for providing location based services to a requesting mobile computing device, the method comprising:
   receiving a handoff request from the mobile computing device to identify alternate tracking services that provide location information for determining a location of the mobile computing device;
   identifying available alternate tracking services based on location context information of the requesting mobile computing device; and
   requesting user authorization to transition to one of the identified available alternate tracking services; and
   upon receiving user authorization, transitioning to a designated alternate tracking service in accordance with the received handoff information.

16. The computer-implemented method of claim 15, wherein the handoff request is a detected power down event by the mobile computing device, the identifying alternate tracking services comprises checking services available at the mobile computing device's last location prior to the detected power down event, and the requesting user authorization comprises determining whether a transition to the designated alternate tracking service was authorized prior to the power down event.

17. The computer-implemented method of claim 15, further comprising:
   receiving a location information request from a location observer of the mobile computing device;
   requesting user authorization to transmit location information to the requesting location observer; and
   upon determining the requesting location observer is authorized, transmitting the requested location information from the mobile computing device and/or the designated alternate tracking service in accordance with the user authorization.

18. A system for providing transition handoff tools between location based services through location context integration, the system comprising:

a processor;

at least one communication interface coupled to the processor and configured to receive location context information;

a locator module coupled to the processor and configured to determine relative location of the system; and a memory having computer executable instructions associated therewith, wherein the computer executable instructions are configured to:

identify location context information received from the at least one communication interface and/or the locator module;

prompt for user authorization to designate an external locator device upon detection by the locator module and/or the processor of a potential transition event; and transition from the locator module to the designated external locator device.

19. The system of claim 18, wherein the detected potential transition event is at least one of receiving a power down request, determining a relative proximity to a service threshold, and/or receiving a location event.

20. The system of claim 18, wherein locator module provides location context information that includes global position, local time, relative speed, group dynamics, vehicle attributes.

* * * * *